US010817264B1

(12) United States Patent
Goodsitt et al.

(10) Patent No.: US 10,817,264 B1
(45) Date of Patent: Oct. 27, 2020

(54) USER INTERFACE FOR A SOURCE CODE EDITOR

(71) Applicant: Capital One Services, LLC, McLean, VA (US)

(72) Inventors: Jeremy Goodsitt, Champaign, IL (US); Mark Watson, Sedona, AZ (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/706,956

(22) Filed: Dec. 9, 2019

(51) Int. Cl.
*G06F 9/44* (2018.01)
*G06F 8/33* (2018.01)
*G06N 20/00* (2019.01)
*G06N 3/08* (2006.01)
*G06F 40/166* (2020.01)

(52) U.S. Cl.
CPC ............. *G06F 8/33* (2013.01); *G06F 40/166* (2020.01); *G06N 3/08* (2013.01); *G06N 20/00* (2019.01)

(58) Field of Classification Search
None
See application file for complete search history.

(56) References Cited

U.S. PATENT DOCUMENTS

| | | |
|---|---|---|
| 4,688,195 A | 8/1987 | Thompson et al. |
| 4,829,423 A | 5/1989 | Tennant et al. |
| 5,369,573 A | 11/1994 | Holloran et al. |
| 5,377,103 A | 12/1994 | Lamberti et al. |
| 5,386,556 A | 1/1995 | Hedin et al. |
| 5,587,903 A | 12/1996 | Yale |
| 5,608,622 A | 3/1997 | Church |
| 5,737,608 A | 4/1998 | Van De Vanter |
| 5,748,975 A | 5/1998 | Van De Vanter |
| 5,864,789 A | 1/1999 | Lieberman et al. |
| 6,460,031 B1 | 10/2002 | Wilson, III et al. |
| 6,466,900 B1 | 10/2002 | Lissauer et al. |
| 7,711,548 B2 | 5/2010 | Carroll et al. |
| 7,930,319 B2 | 4/2011 | Zhang |
| 8,438,007 B1 | 5/2013 | Hokari et al. |
| 9,600,244 B1 * | 3/2017 | Hwang .................. G06F 8/30 |
| 2002/0166114 A1 | 11/2002 | Proebsting et al. |
| 2003/0135358 A1 | 7/2003 | Lissauer et al. |
| 2006/0277525 A1 * | 12/2006 | Najmabadi .............. G06N 5/04 717/106 |
| 2007/0005342 A1 | 1/2007 | Ortscheid |
| 2008/0263443 A1 | 10/2008 | Maxime |
| 2008/0307400 A1 * | 12/2008 | Dalal ..................... G06F 40/40 717/142 |
| 2009/0241102 A1 | 9/2009 | Wang |
| 2009/0326917 A1 | 12/2009 | Hegenberger |
| 2010/0169871 A1 | 7/2010 | Villadsen |
| 2011/0071973 A1 | 3/2011 | Zhang |
| 2011/0112993 A1 | 5/2011 | Zhang |

(Continued)

*Primary Examiner* — Insun Kang
(74) *Attorney, Agent, or Firm* — Hunton Andrews Kurth LLP

(57) ABSTRACT

A system is described which recognizes patterns or conventions that programmers follow when writing source code and creates a repository for these patterns. The system makes suggestions for variable names based on the stored patterns. The system can suggest variable names that are closest to the convention (e.g., the convention demonstrated by the stored pattern) and alert the programmer when the programmer deviates from the convention.

16 Claims, 6 Drawing Sheets

(56) References Cited

U.S. PATENT DOCUMENTS

| | | | | |
|---|---|---|---|---|
| 2013/0204610 | A1 | 8/2013 | Wu | |
| 2015/0135166 | A1* | 5/2015 | Tarlow | G06F 11/3604 |
| | | | | 717/125 |
| 2016/0034275 | A1* | 2/2016 | Abuelsaad | G06F 8/72 |
| | | | | 717/123 |
| 2016/0041815 | A1* | 2/2016 | Bhagat | G06F 8/36 |
| | | | | 717/107 |
| 2016/0062790 | A1* | 3/2016 | Greene | G06F 8/75 |
| | | | | 718/101 |
| 2017/0212829 | A1* | 7/2017 | Bales | G06F 11/3664 |
| 2017/0371629 | A1* | 12/2017 | Chacko | G06F 8/36 |
| 2018/0095746 | A1* | 4/2018 | Henriksen | G06F 11/3692 |
| 2018/0293056 | A1* | 10/2018 | Greenberger | G06F 8/34 |
| 2018/0329688 | A1* | 11/2018 | Evans | G06F 8/33 |
| 2019/0121621 | A1* | 4/2019 | Aggarwal | G06F 8/427 |
| 2019/0220253 | A1* | 7/2019 | Pradhan | G06F 8/33 |
| 2019/0227774 | A1* | 7/2019 | Banuelos | G06F 8/33 |
| 2019/0243617 | A1* | 8/2019 | Stevens | G06F 11/3664 |
| 2019/0243622 | A1* | 8/2019 | Allamanis | G06F 8/33 |
| 2019/0272171 | A1* | 9/2019 | Chen | G06F 8/75 |
| 2019/0303107 | A1* | 10/2019 | Kelly | G06F 8/33 |
| 2019/0303140 | A1* | 10/2019 | Kelly | G06K 9/6282 |
| 2019/0317734 | A1* | 10/2019 | Chen | G06F 8/33 |
| 2019/0324727 | A1* | 10/2019 | Carranza | G06F 8/49 |
| 2019/0392329 | A1* | 12/2019 | Rangarajan | G06F 8/75 |

* cited by examiner

USER INTERFACE FOR A SOURCE CODE EDITOR

BACKGROUND

Programming style is a set of rules or guidelines used when writing the source code for a computer program. Following a particular programming style can help programmers read and understand source code better and avoid introducing errors. The programming style used in a particular program may be derived from the coding conventions of a company or other computing organization as well as the preferences of the author of the code. Some programming styles can be designed for a specific programming language. However, some styles are commonly applied to many languages.

SUMMARY

There are certain aspects of programming (or coding) that are stylistic. These aspects do not impact the functioning or execution of the code, but they enhance reviewability or readability of the program for other programmers. The following are a few examples of stylistic aspects of programming which enhance reviewability and readability of source code: layout of the source code (e.g., indentations); use of white space around operators and keywords; capitalization of keywords and variable names; spelling of user-defined identifiers such as function, procedure and variable names; and use of comments. A Good style is a subjective matter, and is difficult to define.

Oftentimes, beginner programmers or programmers new to a team are not familiar with conventions used by the team. These programmers fail to follow appropriate conventions for writing various syntax or variable names, and as a result, they write source code in a manner that is hard to understand or follow for other programmers who are familiar with the conventions. At the same time, these conventions are team specific, and as such, there is no quick and practical way for new programmers to learn them.

For example, the programming language Python has a built-in function named "open." This function opens a file and stores it as an object. The "open" function is defined to receive a variable argument storing a file address. A programmer can write a line of source code as follows: "open (A) as B." This line can open a file located at a destination stored in variable A and save the file as an object in variable B. This line is technically correct and when a machine runs this line, the machine achieves the same result provided that the variable argument represented by "A" is the same.

However, when a programmer reviews source code including the above line, the source code fails to provide any contextual information about variables A and B. In other words, the above line does not follow any programming convention, and thus, it may be difficult for the programmer to ascertain any contextual information about the function or its variables. However, this line can be rewritten in a more informative and readable fashion. For example, the programmer can rewrite the same line of code as "open (FilePath) as ObjectFile." Although in terms of functionality this line of code achieves the same result as "open (A) as B," when reviewing the rewritten line, the reviewer can immediately understand that the FilePath is a destination for a file and that the variable ObjectFile is an object file. Following this convention in naming variable names can give visibility to the variables.

When programmers write source code, there can be many functions which require variables as input or output, e.g., opening a network connection, using a database, and accessing some external system. An object of this disclosure is to describe a system, method and software application which recognizes patterns or conventions that programmers follow when writing source code and create a repository of these patterns. Another object of this disclosure is to make suggestions for variable names based on the stored patterns. The system can suggest variable names that are closest to the convention (e.g., the convention demonstrated by the stored pattern). The software application can also alert the user when the user deviates from the convention.

DETAILED DESCRIPTION

Figure 1:
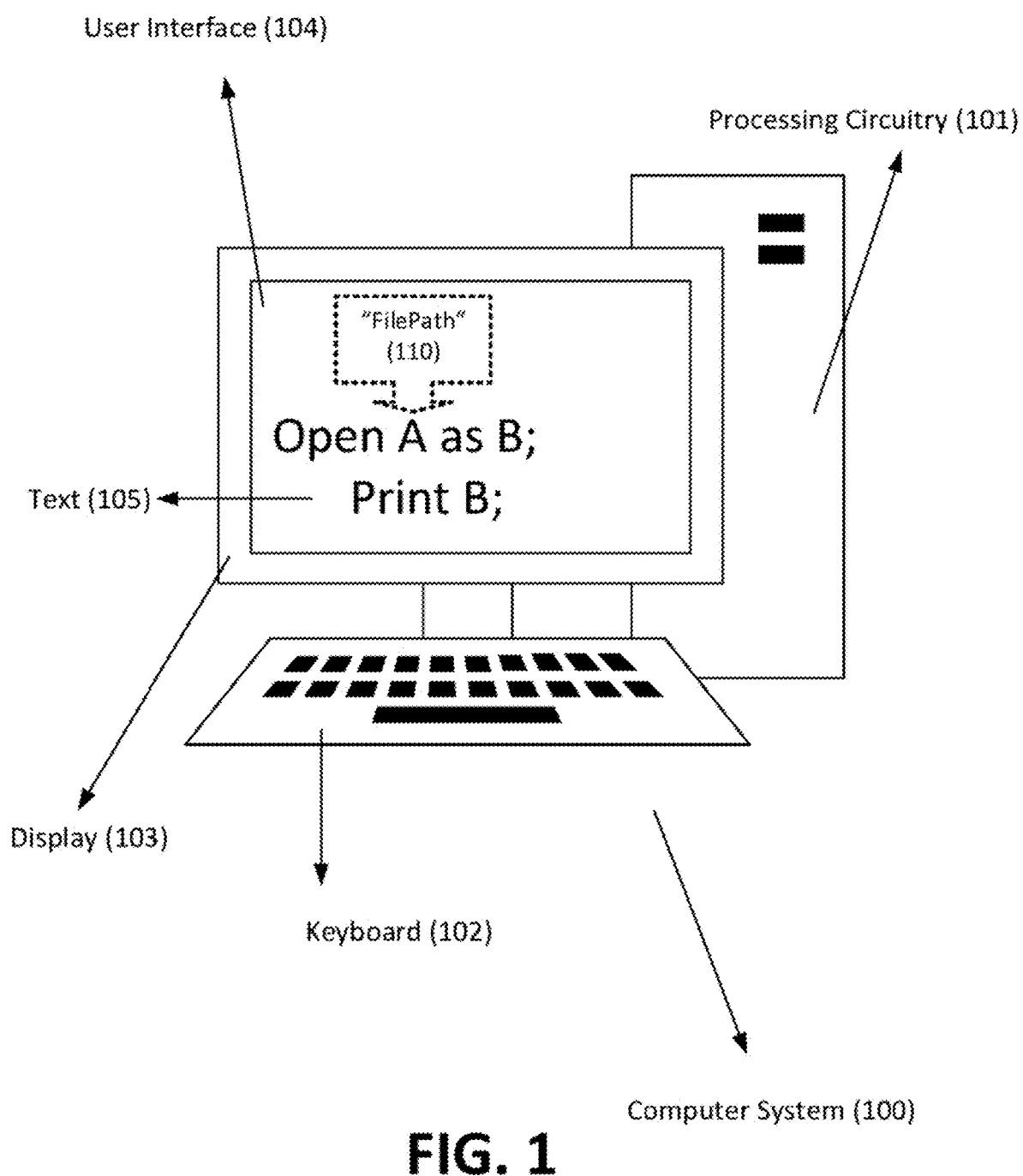
FIG. 1 shows an example computer system for receiving text input and displaying suggestions relating to a programming convention.

Compile a Database of all Mappings Between Functions and Variables

In an example embodiment, a computer system (or server) can include a set of mappings stored on a database of the computer system. These mappings can display relationships or associations between functions (or syntax) and variable names. For example, a mapping can establish that for the function "open . . . as," in one instance, the variable names FilePath and ObjectFile are used.

In one example embodiment, the mappings can be defined manually. For example, a programmer, based on the programmer's experience can create various mappings for various functions (or syntax). The programmer can specify, e.g., as a rule or other code implementing the mapping, that each time the function "open . . . as" is invoked, the variable names FilePath and ObjectFile should be used with this function.

In an example embodiment, the computer system can generate the mappings based on a repository of source code provided to the system. For example, the computer system can include a database for storing a repository of source code, i.e., the source code repository. The source code repository can store "idealized" source code, which can include source code that demonstrates at least one programming convention, rule or mapping. In one example embodiment, "idealized" source code can include source code created by a team or team leader. In another example embodiment, "idealized" source code can include source code created by a company. In another example embodiment, "idealized" source code can include global source code, e.g., source code retrieved from a public database or scraped form the internet or other source.

In one example embodiment, each source code file stored in the source code repository can be associated with an identifier. For example, the identifier can be an identity of the person who drafted the code. As another example, the identifier can be an identity of the company or team which drafted the code. In one example embodiment, each segment of the code can be associated with an identifier. For example, the identifier can be the identity of the programmer who created the code or edited the code, e.g., the first five lines of a source code file can be associated with a first writer and the second five lines can be associated with a second writer.

In an example embodiment, the database of the computer system can include a repository for functions (or syntax), i.e., the function repository. The function repository can include built-in functions and commonly used functions. A built-in function is a function that is built into a programming language and can be accessed by all end-users. A built-in function can be provided in a standard library for a programming language. For example, most programming languages include a function for opening files, e.g., "open," as part of their standard library. A module of the computer system can access the programming language specification for a programming language and obtain a list of the built-in functions for the programming language. The module can also access the programming language specification and obtain a list of variable arguments used for each function. For example, for the function "open . . . as," the module can obtain two variable arguments, one for entering a file address and one for storing the object file.

Some commonly used functions are not included in the standard library for a programming language. Commonly used functions can be extracted from public or shared libraries, which can include a collection of source code used by a particular programming language. The module of the computer system can access the specification for a public library and obtain a list of the commonly used functions for the programming language. As another example, the list of commonly used functions for a public library can be manually defined.

In one example embodiment, a module (or a part) of the computer system can analyze the "idealized" source code provided in the source code repository and identify mappings or associations between functions (or syntax) and variable argument names used for the respective functions. The module can store the mappings or associations in the database of the computer system. For example, for each instance a function is used within one source code file, the module can cross check the function with the functions stored in the function repository. The module can use fuzzy matching for this purpose. If the function is a function stored in the function repository, the module can look for the variable argument names used in association with the function. Once the variable argument names are found, the module can store in the database the function and the variable argument names in association with the function. In one example embodiment, docstrings can be utilized to determine variable or argument names used with each function implemented in a piece of idealized source code. In another example embodiment, a function can be utilized to determine variable or argument names used with each function implemented in a piece of idealized source code.

As another example, when reviewing a source code file, the module can find an "open . . . as" line of code. The module can cross check the function repository to ensure that the "open . . . as" line is indeed a function stored in the function repository, e.g., it is a built-in function. Once the module confirms that the "open . . . as" code is a function stored in the function repository, the module can look up the variable arguments used in connection with the "open . . . as" function. In this case, the variable arguments can be two, one for entering a file address and one for storing the object file. The module can look for these variable arguments and store their respective names in association (or as a mapping in connection) with the function "open . . . as."

In one example embodiment, in addition to variable argument names, other contextual data can be stored in association with functions. This context data can include information which can assist with or facilitate determining a convention used in writing source code. For example, the context data can include the functions (or syntax) or variable argument named used before or after a specific instance of a function, e.g., within 200 words of an "open . . . as" function, the function "print" or the variable argument name "Document" is used. As another example, context data can include mappings or associations before or after a specific instance of a function (or syntax), e.g., immediately after an "open . . . as" function a function "print" with a variable argument name "Document" is used. As yet another example, context data can include the name of the writer or editor of source code. As yet another example, context data can include the name of the company or team which wrote the source code. Companies and teams within a company may have their own syntax preferences and these syntax preferences can be identifiers when evaluating the code. For instance, for a user who is a member of team A, the user's syntax should be evaluated against team A's standards. As such, this context data can facilitate determination of the team's preferences. The module can store context data in the database for each association or mapping.

In one example embodiment, the module of the computer system can use an identifier of a source code file when storing the mappings for functions and variable names. For example, the module can search for and store mappings that relate to a particular identifier, e.g., the module can search for and store mappings only for one particular programmer or team. For each segment of a source code file, the module can search for and store the mappings only if that segment is related to the particular identifier. For example, if one source code file is written by two programmers, the module can only analyze the segment relating to the one of the programmers that relates to the identifier number. Using the identifier number in creating the mappings, the system of present disclosure can detect conventions at a granular level, e.g., the system can detect conventions for each programmer, each time or each company.

In one example embodiment, a module of the computer system can cluster the mappings or associations by function. For example, the clustering can be based on, e.g., a team's conventions. In other words, the team may use the same function name, but by clustering, one can look at the cluster of mappings to variable names to see what is common in the team. As another example, the clustering can be based on the functions themselves and are determining what the functions do, e.g., their intentions. Then, one can cluster functions together to identify common naming systems for functions with these intentions. In another example embodiment, the module can cluster the mappings based on the degree of similarity for variable naming considered common.

In one example embodiment, clustering can be k-means clustering which is a method of vector quantization. k-means clustering aims to partition n observations into k clusters in which each observation belongs to the cluster with the nearest mean, serving as a prototype of the cluster.

This results in a partitioning of the data space into Voronoi cells. k-Means minimizes within-cluster variances (squared Euclidean distances).

In one example embodiment, clustering for names is similar to a fuzzy match in the sense that it finds names that are similar to determine appropriate naming conventions. In one example embodiment, the clustering is performed with "intention" as this can provide context for how to name a function or variable. In one example embodiment, one can use a form of topic modeling for clustering or keyword/intention clustering. In this example, one is looking for functions with similar intent by clustering together features, which describe the intent of the functions. The features can include descriptions of the functions, inputs or outputs of the functions and their respective descriptions, function names within the functions, etc.

Training Dataset and Training a Model

In one example embodiment, the mappings and associations stored on the database can provide data for a training dataset. Specifically, the training dataset can be provided to a model which can learn the conventions from the training dataset. Subsequently, the model can be provided with an input and make a suggestion based on the input and conventions learned from the data. In one example embodiment, the model can be a convolutional neural network or a recurrent neural network.

In one example embodiment, multiple datasets are used at different stages of creating the model. These datasets can include a training dataset, a validation dataset and a test dataset. Initially, the training dataset can be used to fit the parameters of the model. The training dataset can include an input vector and the corresponding answer vector (or the target or label). In this stage, the training dataset is fed to the model and the model produces a result set, which can be compared with the target. Based on this comparison, the parameters of the model can be adjusted. After adjusting the parameters of the model, a validation dataset can be fed into the model to further refine the parameters of the model. The validation dataset provides an unbiased evaluation of the model fit on the training dataset while tuning the model's hyperparameters. Finally, the test dataset can be used to provide an unbiased evaluation of a final model fit on the training dataset. Yet in other embodiments, there is no need for training a model using the datasets as described above because fewer or more datasets can be used to train the model.

In one example embodiment, for each respective machine learning technique, there can be different datasets. The database of functions and mappings can be datasets for the clustering or identifying similar naming schemes. In one example embodiment, recurrent neural network and natural language processing ("NLP") datasets can be e.g., text or code-like snippets with the associated topics, labels or intents that can be mapped via database to the function name. When new functions have similar intents, topics or labels, the model can associate with the functions that are similar to determine what a naming scheme could be.

In one example embodiment, a regular expression technique can be used to make recommendations for a variable name. A regular expression (or regex) is a sequence of characters that define a search pattern. Usually such patterns are used by string searching algorithms for "find" or "find and replace" operations on strings, or for input validation. Regular expressions are used in search engines, search and replace dialogs of word processors and text editors, in text processing utilities such as sed and AWK and in lexical analysis. Many programming languages provide regex capabilities either built-in or via libraries.

In particular, in this context, the model is learning the regular expression (i.e., convention). Once the model learns the regular expression, the model can make predictions about any expression that it receives. For example, the model can predict if the expression is "regular," and if the expression is not "regular," the model can make a suggestion as to what is "regular expression" in the context of the expression provided to the model.

For determining regex, the system can be pre-trained in how to determine the regex of already existing expression. In one example embodiment, regular expression can be utilized to determine whether or not a submitted name meets the pattern of the regular expression. Examples can also be curated based on the regular expression to create examples. In one example, regex can be used to predict examples that the model used when learning the regular expression.

Making Recommendations

In one example embodiment, a programmer can type source code in an editor, and as the programmer types variable names in the editor, the editor evaluates the variable names and makes recommendations if the variable names deviate from a convention. For example, the programmer can type "open A as B" in the editor of a client device. The editor can transmit this line of code to a module which can use a model to determine if this line of code deviates from a convention. The module can be stored and executed on the client device or a computer system in communication with the client device. The module can evaluate the line of code and determine whether this line deviates from a convention. In this example, the module can determine that the convention for the function "open . . . as" is using "FilePath" and "ObjectFile" as the variable names. Accordingly, the module can transmit these names to the editor, which can alert the user about deviating from the convention.

In one example embodiment, the module may alert the programmer only if the programmer deviates from a convention by more than a threshold value. The threshold value can define how close two strings (e.g., variable names) need to be in order for the module to consider them similar or equal. The threshold value can also take into consideration whether two strings are synonymous. For example, if a programmer uses the "open . . . as" function and the variable "FilePAT" as a variable argument for the function, the module might not alert the programmer because "FilePath" and "FilePAT" are close enough. As another example, a module might not alert a programmer if the programmer uses "FileDestination" as an argument variable because "Path" and "Destination" are synonymous. However, the module can alert the programmer if the programmer uses "FilePicture" as the variable argument because "Picture" and "Path" are not similar strings (i.e., different more than a threshold value) and they are not synonymous.

In one example, the method of present disclosure can suggest function names. When function names can cluster with other very similar functions, then that information can help refine the naming of the function. By learning the intention of the function, functions can be clustered together and the appropriate name for functions with those intentions as well as variable format can be learned and determined.

The Architecture of the System

FIG. 1 shows an example computer system 100 for receiving text input and displaying suggestions relating to a programming convention. In this example, the computer system 100 can include processing circuitry 101, which can include a memory and processor. The processing circuitry 101 can include a module for receiving input and making recommendations based on the input. The input can be text (e.g., source code) typed-up by a user via a keyboard 102 or other text entry hardware or software. In this example embodiment, the user can be directly connected to the computer system, e.g., the user can directly provide the input to the computer system 100 when the user types source code on the keyboard 102 because the keyboard 102 is connected to the computer system. The computer system can show a user interface 104 on a display 103 connected to the computer system 100 and the user can change or edit text 105 that appears on the user interface 104, e.g., by using the keyboard 102. The computer system 100 can analyze the text 105 (or source code) and provide a suggestion 110 to the user, e.g., to use a name for a variable that follows a company specific convention. The suggestion 110 can be displayed on the user interface 104 and the user can accept or reject the suggestion. If the user accepts the suggestion, the computer system 100 can edit the text displayed on the user interface 104 and implement the suggestion in the text 105, e.g., change the name of a variable. If the user rejects a suggestion, the computer system 100 may take no further action with respect to the part of the text 105 pertaining to the suggestion 110.

Figure 2:
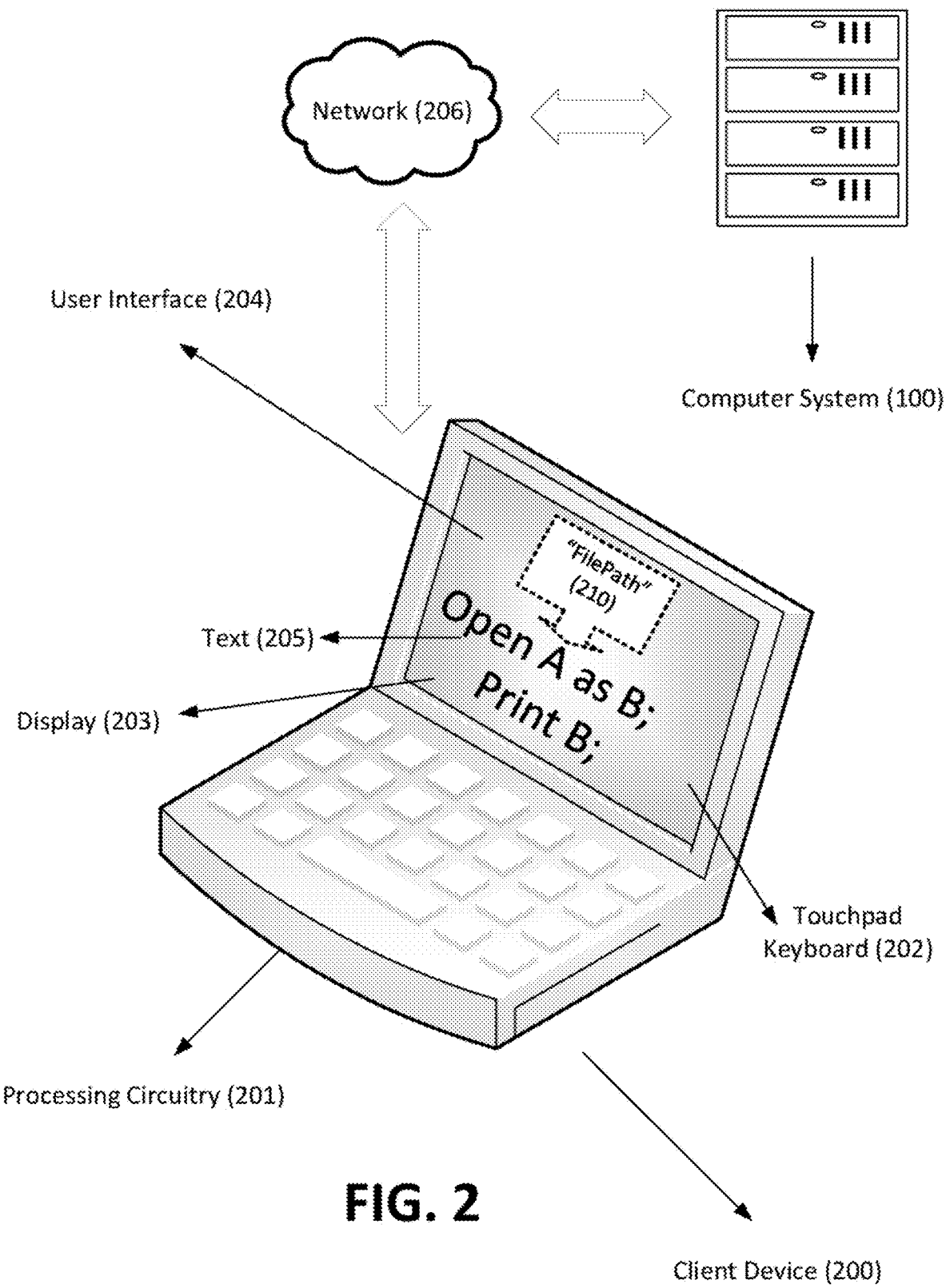
FIG. 2 shows an example client device for receiving text input and displaying suggestions relating to a programming convention.

FIG. 2 shows an example client device 200 for receiving text input and displaying suggestions relating to a programming convention. The client device 200 can be a desktop computer, a laptop, a tablet, a cellphone, a wearable device, etc. In this example embodiment, the client device 200 can include processing circuitry 201 and a touchpad keyboard 202. Using the touchpad keyboard 202, the processing circuitry 201 can receive a user's input and display the input as text 205 on a user interface 204 of a display device 203. The client device 200 can be in communication with a computer system 100, which can include a module for receiving input from the client device 200 and making recommendations based on the input. The client device 200 can receive the recommendations from the computer system 100 and display the recommendations to the user.

For example, using the touchpad keyboard 202, the user can type the text 205 in the user interface 204 of the client device 200. After receiving the text 205, the client device 200 can transmit the text 205 to the computer system 100, which includes a module for making suggestions relating to a programming convention. The module can evaluate the text 205 and make a recommendation as to changing the name of variable "A" to "FilePath." The computer system 100 can transmit this recommendation to the client device 200, and the client device 200 can display this recommendation in the user interface 204.

The User Interface

Figure 3:
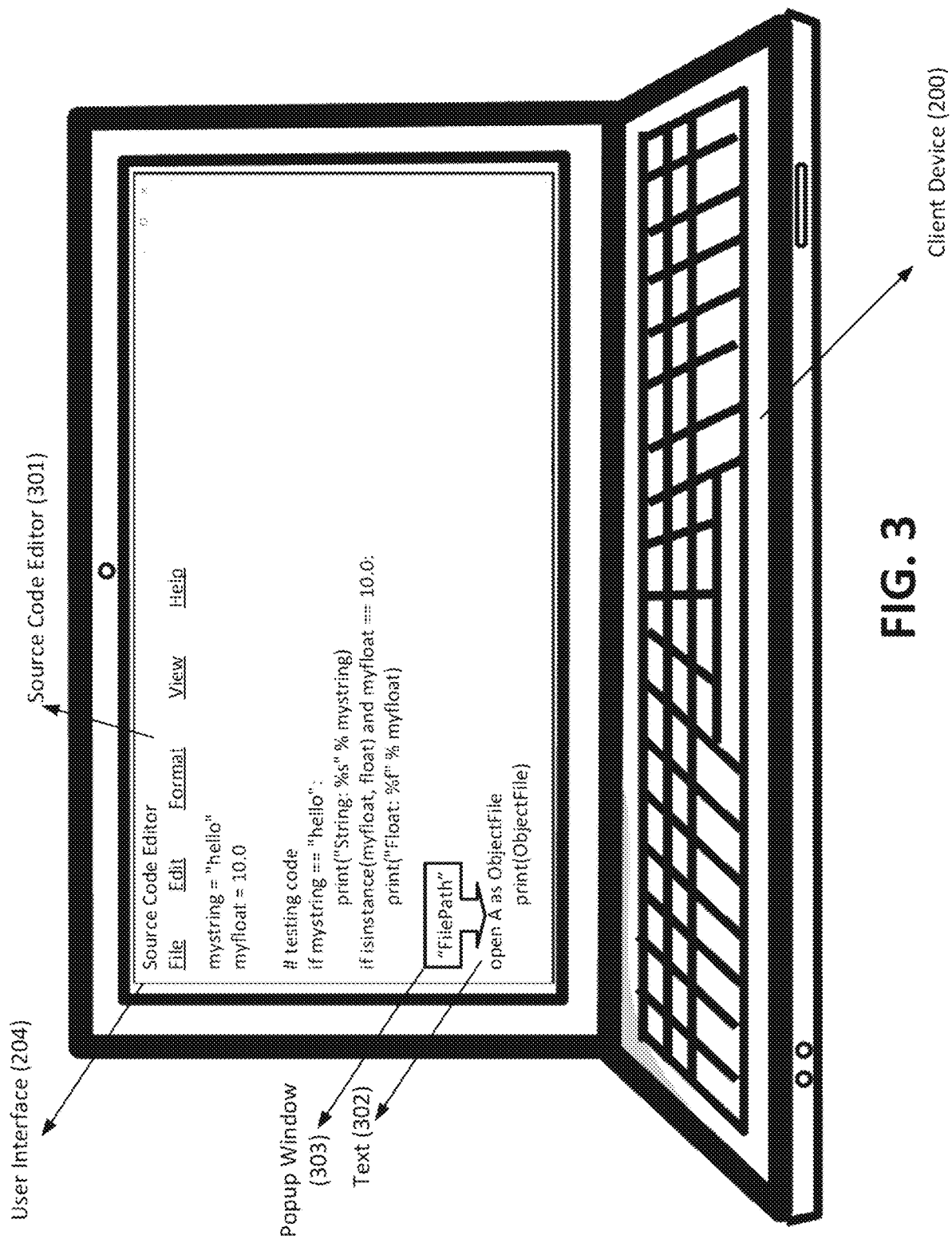
FIG. 3 shows an example user interface displayed in a client device.

FIG. 3 shows an example user interface 204 displayed in the client device 200. In this example embodiment, the user interface 204 can display a source code editor 301. The editor 301 can enable the user to enter text through a keyboard, e.g., keyboard 102. The editor 301 can also enable the user to edit or revise text 302 already displayed in the editor 301. The client device 200 can receive text as input from the user and display the text within the confines of the editor 301 in the user interface 204.

The editor 301 can further transmit the text 302 to a module to evaluate the text 302 and make recommendations where a convention is ignored. The module can be stored and executed on the client device 200 or on a computer system in communication with the client device 200. In this example embodiment, by using the variable argument name "A" for the function "open . . . as," the user deviated from a convention that requires the user to use the variable argument name "FilePath" for this variable argument. Accordingly, the editor 301 can alert the user.

In one example embodiment, the editor 301 can display a popup window 303 over the text 302 to alert the user about the deviation from the convention. In this example embodiment, the window 303 displays the appropriate name for the variable argument "A" according to the convention. In one example embodiment, the editor 301 can substitute the variable argument name with an appropriate variable argument name whenever the user deviates from the convention. For example, the editor 301 can automatically substitute the name "A" with the name "FilePath" every time the user uses the variable argument name "A" for the function "open . . . as."

Figure 4:
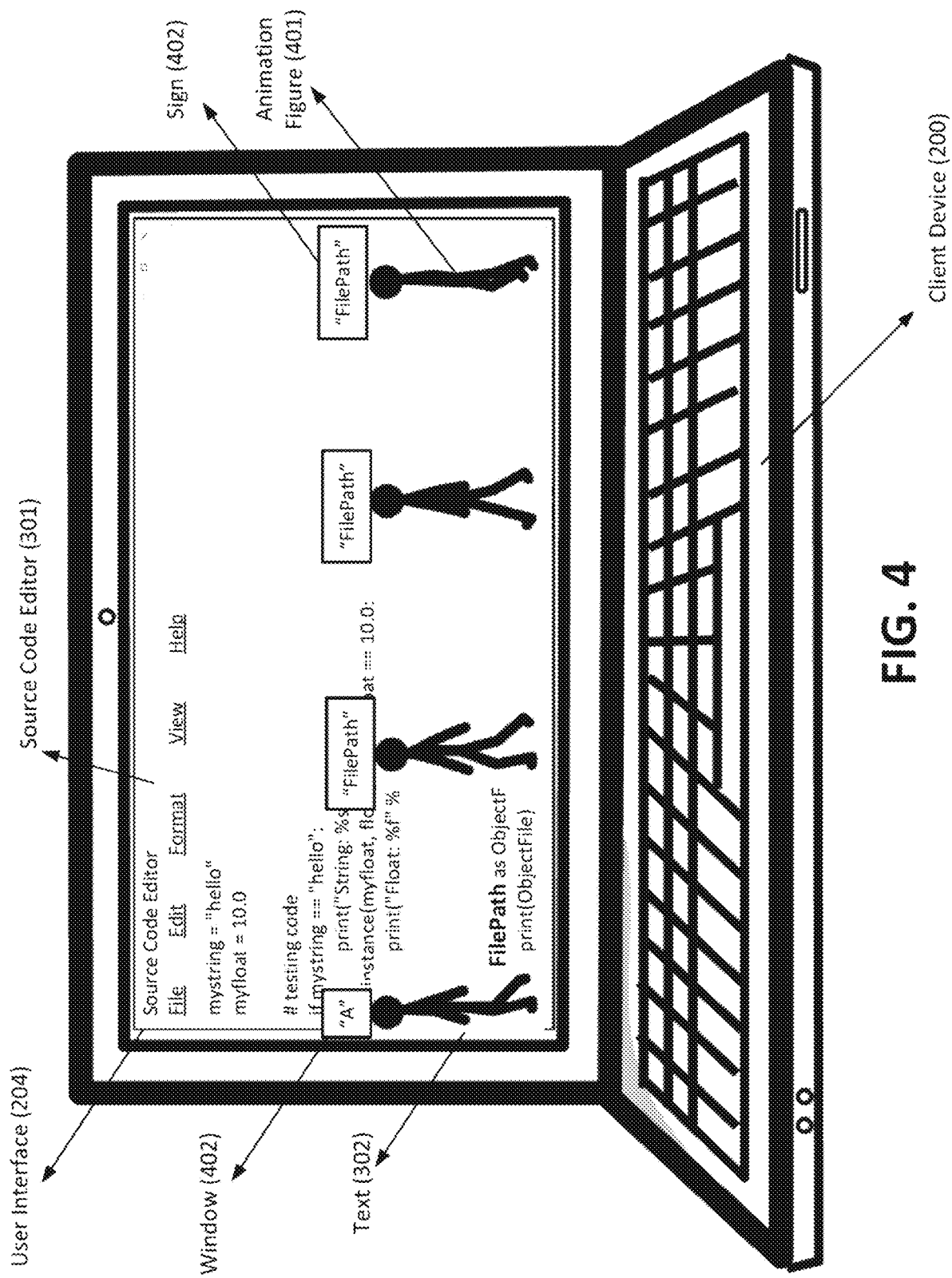
FIG. 4 shows an example editor which can display an animation character changing an incorrect variable name.

In one example embodiment, the editor 301 can display an animation figure crossing the editor window and substituting the variable argument name that deviates from a convention (i.e., incorrect variable name). FIG. 4 shows an example editor 301 which can display an animation character changing an incorrect variable name. In this example embodiment, when a user types a variable name that deviates from a convention, e.g., "open A as ObjectFile," the editor 301 can initiate the movement of the animation character. Specifically, the editor 301 can initiate the movement of at least one animation FIG. 401 holding a sign 402, which can display the appropriate name for the variable. The animation FIG. 401 can cross the user interface 204 from right to left and before reaching the incorrect variable name, the sign can display the appropriate variable name. Once the animation FIG. 401 reaches the incorrect variable name, the animation FIG. 401 can substitute the variable name in the text 302. At the same time, the sign can be substituted, i.e., from the appropriate variable name to the incorrect variable name. Then, the animation FIG. 401 can continue to move to the left side of the window while holding the incorrect variable name. Research shows that humans learn visual cues faster than other cues. As such, it is important for the editor 301 to show, in one embodiment, the substitution of the incorrect variable name with an appropriate viable name using a visual cue.

Figure 5:
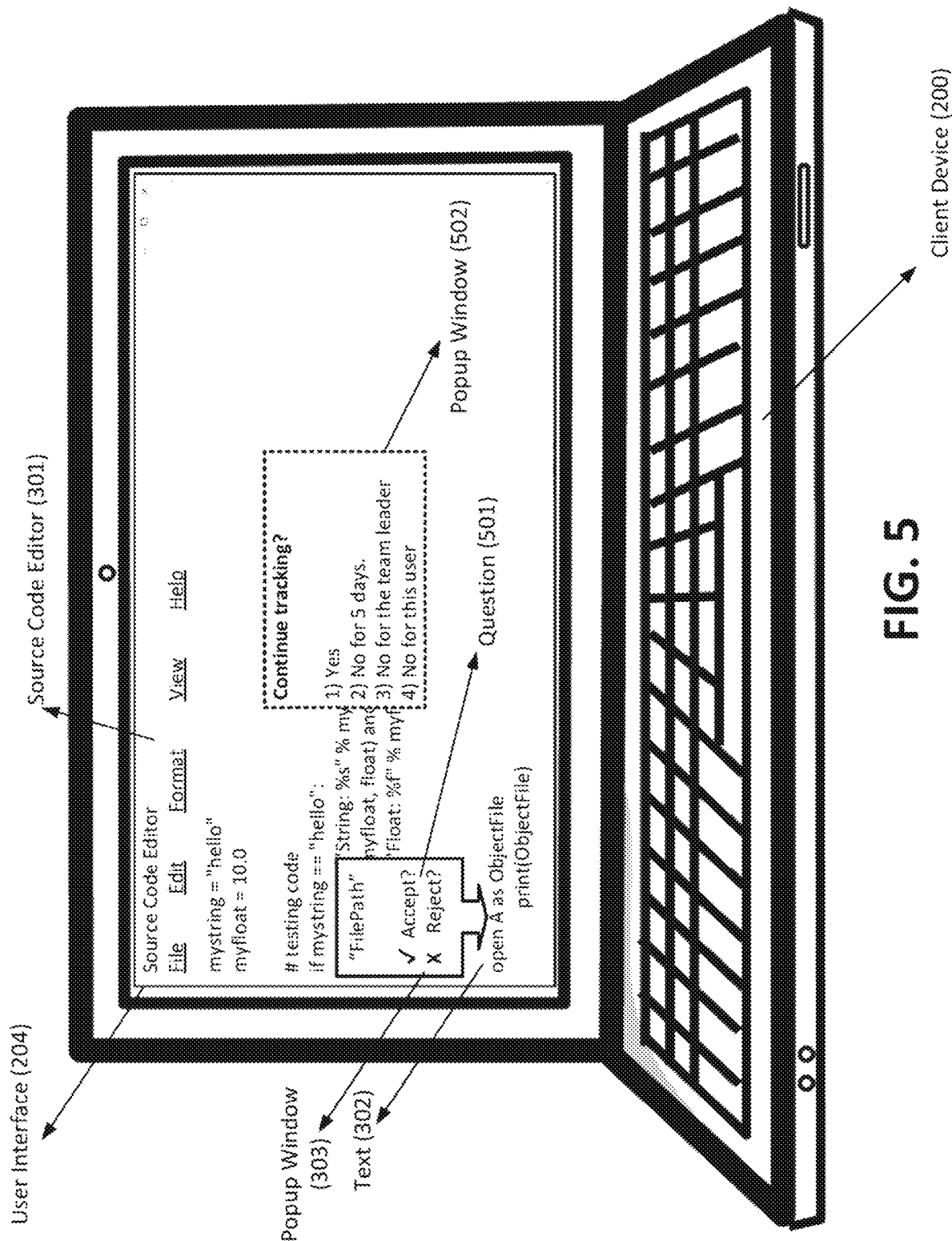
FIG. 5 shows an example editor which enables the user to provide feedback to a recommendation module.

FIG. 5 shows an example editor which enables the user to provide feedback to a recommendation module. In this exam example embodiment, a module can make recommendations to a user based on a programming convention. The recommendation can be displayed in a popup window 303. Additionally, the popup window 303 can display a question 501. For example, the question 501 can ask the user if the user wants to implement the recommendation. If the user clicks on accept, the recommendation can be automatically implemented, i.e., the editor 301 can automatically change the variable name "A" to "FilePath." If the user clicks on reject, the user can be prompted with a follow up question, e.g., a popup window 502. The follow up question can ask the user if the editor 301 should keep track of the same type of recommendation throughout the source code. In response, the user can specify that the editor should keep track of the recommendation or should stop keeping track of the recommendation. The user can ask the editor to stop keeping track of the recommendation for a period of time, e.g., 5 days. In one embodiment, the user can ask the editor to stop keeping track of the recommendation for a particular user, e.g., the user or another user, etc. In one example embodiment, the option to keep track of a type of recommendation can be stopped only by an instruction by a team leader, i.e., the editor will stop keep tracking the type of recommendation only if a user which has the team leader or administrator credentials instructs the editor to stop.

In one example embodiment, there can be a hierarchy of programmers and the editor can make recommendations to the programmers based on each programmer's standing in the hierarchy. The editor can be in communication with a module which can make recommendations about conventions. The module can make recommendations based on the programmer's rank in the hierarchy. For example, the module knows about the conventions that a junior programmer follows and the conventions that a senior programmer follows (because using the identifier for each source code file, source code drafted by each programmer can be collected). When the junior programmer logs into the client device, the editor can recommend the conventions of the senior programmer to the junior programmer because the senior programmer is superior to the junior programmer (e.g., based on the hierarchy). However, when the senior programmer logs into the client device, the editor does not make recommendations relating to the junior programmer to the senior programmer because the junior programmer is ranked lower than the senior programmer.

Technical Implementation of the Server

Figure 6:
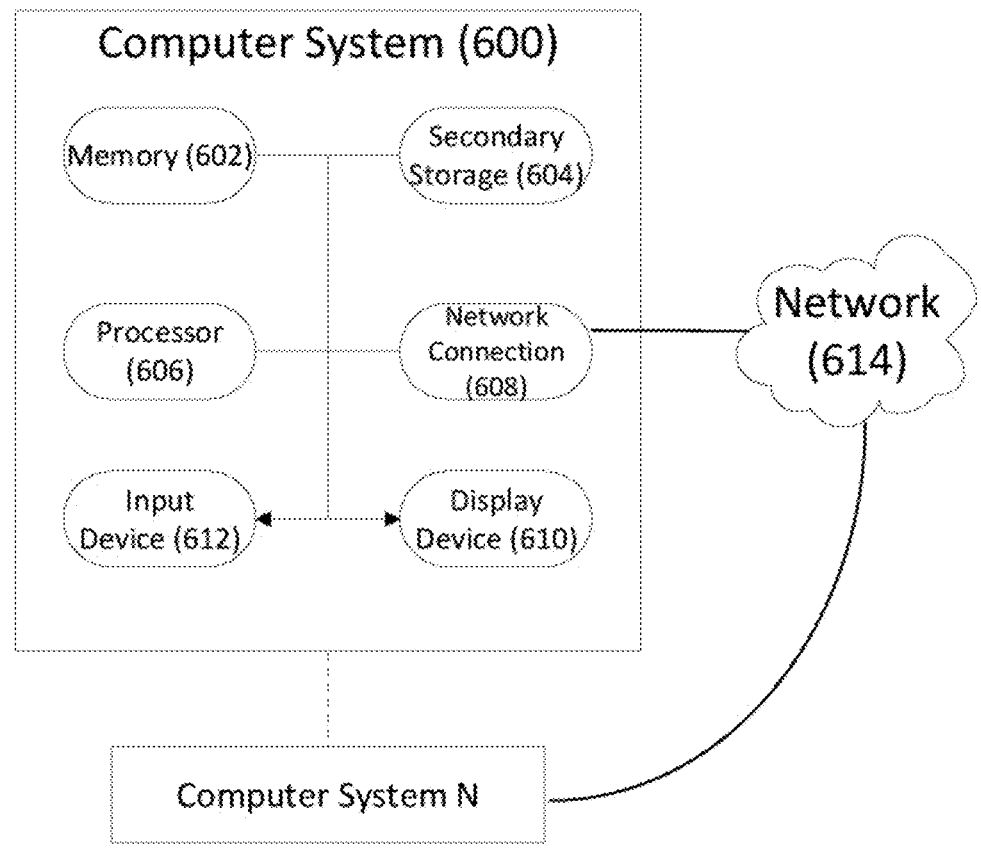
FIG. 6 illustrates exemplary hardware components for a server.

FIG. 6 illustrates exemplary hardware components of a server. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:
generating a database including functions and variable names, wherein each function uses at least one variable name, wherein the function and the at least one variable name are associated with a developer identifier;
generating a training dataset;
training a machine learning model using the training dataset including the functions, the variable names, and for each function, the developer identifier;
receiving, from a programming unit, an input including an input function and an input variable name;
providing the input function and the input variable name to the machine learning model;
receiving a prediction variable name from the machine learning model;
comparing the prediction variable name to the input variable name; and
when the prediction variable name differs from the input variable name by more than a predefined threshold value, transmitting the prediction variable name to the programming unit and displaying the prediction variable as a recommended variable name to use in the programming unit, wherein the machine learning model recommends the prediction variable name based on a regular expression convention learned from the training dataset, the prediction variable name differs from the input variable name by more than a predefined threshold value when the input variable name is not within a modified regular expression convention as the prediction variable name, and the modified regular expression convention is the regular expression convention changed by the predefined threshold value.

2. The method of claim 1, wherein the training dataset is a subset of the database.

3. The method of claim 1, wherein the training dataset includes one function and a plurality of variable names used for the one function.

4. The method of claim 1, wherein the database includes context data associated with each function.

5. The method of claim 4, wherein the context data associated with each function is variable names used before the function, variable names used after the function, other functions used before the function and other functions used after the function.

6. The method of claim 1, wherein the training step uses a convolutional neural network model or a recurrent neural network model.

7. The method of claim 1, wherein the regular expression convention is a likely expression to be used based on the training dataset.

8. The method of claim 1, wherein the prediction variable name differs from the input variable name when the input variable name is not within the same regular expression convention as the prediction variable name.

9. The method of claim 1, wherein the prediction variable name does not differ from the input variable name when the input variable name is within the same regular expression convention as the prediction variable name.

10. The method of claim 1, wherein the prediction variable name differs from the input variable name by more than a predefined threshold value when the input variable name is not within the same regular expression convention.

11. A non-transitory computer-readable medium on which are stored instructions that are executable by a processor and that, when executed by the processor, cause the processor to perform a method for displaying a graphical user interface for receiving programming code from a user, the method comprising:
receiving an input including an input function and an input variable name;
providing the input function and the input variable name to a machine learning model trained by a training dataset including functions and variable names associated with a developer identifier, wherein each function is associated with at least one variable name;
receiving a prediction variable name from the machine learning model;
comparing the prediction variable name to the input variable name; and
when the prediction variable name differs from the input variable name by more than a predefined threshold value, displaying the prediction variable name as a recommended variable name to use to a user, wherein the machine learning model recommends the prediction variable name based on a regular expression convention learned from the training dataset, the prediction variable name differs from the input variable name by more than a predefined threshold value when the input variable name is not within a modified regular expression convention as the prediction variable name, and the modified regular expression convention is the regular expression convention changed by the predefined threshold value.

12. The non-transitory computer-readable medium of claim 11, wherein the displaying step includes showing a pop-up window in the graphical user interface.

13. The non-transitory computer-readable medium of claim 11, wherein the displaying step includes showing the prediction variable name in a light color.

14. The non-transitory computer-readable medium of claim 11, wherein the processor uses a fuzzy logic matching to identify a function typed by the user in the graphical user interface.

15. The non-transitory computer-readable medium of claim 11, wherein the training step uses a convolutional neural network model or a recurrent neural network model.

16. The non-transitory computer-readable medium of claim 11, wherein the regular expression convention is a likely expression to be used based on the training dataset.

* * * * *